United States Patent
Kraft et al.

(10) Patent No.: US 9,777,630 B2
(45) Date of Patent: Oct. 3, 2017

(54) GAS TURBINE FAST REGULATION AND POWER AUGMENTATION USING STORED AIR

(71) Applicant: PowerPHASE LLC, Jupiter, FL (US)

(72) Inventors: Robert J. Kraft, Tequesta, FL (US); Scott Auerbach, Jupiter, FL (US); Peter Perri, Jupiter, FL (US)

(73) Assignee: POWERPHASE LLC, Jupiter, FL (US)

( * ) Notice: Subject to any disclaimer, the term of this patent is extended or adjusted under 35 U.S.C. 154(b) by 253 days.

(21) Appl. No.: 14/534,598

(22) Filed: Nov. 6, 2014

(65) Prior Publication Data
US 2016/0131031 A1 May 12, 2016

(51) Int. Cl.
| | |
|---|---|
| F02C 1/00 | (2006.01) |
| F02C 6/16 | (2006.01) |
| F02C 6/08 | (2006.01) |
| F02C 7/08 | (2006.01) |
| F02C 7/143 | (2006.01) |
| F02C 7/10 | (2006.01) |
| F02C 6/14 | (2006.01) |
| F02C 3/34 | (2006.01) |

(52) U.S. Cl.
CPC .................. *F02C 6/16* (2013.01); *F02C 3/34* (2013.01); *F02C 6/08* (2013.01); *F02C 6/14* (2013.01); *F02C 7/08* (2013.01); *F02C 7/10* (2013.01); *F02C 7/143* (2013.01); *Y02E 60/15* (2013.01)

(58) Field of Classification Search
CPC ...... F02C 6/14; F02C 6/16; F02C 7/08; F02C 7/10; F02C 7/143; Y02E 60/15
See application file for complete search history.

(56) References Cited

U.S. PATENT DOCUMENTS

| | | | |
|---|---|---|---|
| 3,359,723 A | 12/1967 | Bohensky et al. | |
| 3,831,373 A | 8/1974 | Flynt | |
| 4,281,256 A * | 7/1981 | Ahrens | ..................... F02C 6/16 |
| | | | 290/1 R |
| 4,765,142 A | 8/1988 | Nakhamkin | |
| 4,870,816 A | 10/1989 | Nakhamkin | |
| 4,872,307 A | 10/1989 | Nakhamkin | |
| 4,885,912 A | 12/1989 | Nakhamkin | |
| 4,936,098 A | 6/1990 | Nakhamkin | |
| 5,347,806 A | 9/1994 | Nakhamkin | |

(Continued)

FOREIGN PATENT DOCUMENTS

| | | |
|---|---|---|
| WO | 2013116185 A1 | 8/2013 |
| WO | 2014055717 A1 | 4/2014 |
| WO | 2014066276 A2 | 5/2014 |

OTHER PUBLICATIONS

U.S. Appl. No. 14/350,469, filed Apr. 8, 2014, 141 pages.

(Continued)

*Primary Examiner* — Pascal M Bui Pho
*Assistant Examiner* — Katheryn Malatek
(74) *Attorney, Agent, or Firm* — Lathrop Gage LLP (57) ABSTRACT

The present invention discloses a novel apparatus and methods for augmenting the power of a gas turbine engine, improving gas turbine engine operation, and reducing the response time necessary to meet changing demands of an electrical grid. Improvements in power augmentation and engine operation include systems and methods for providing rapid response given a change in electrical grid.

26 Claims, 6 Drawing Sheets

(56) References Cited

U.S. PATENT DOCUMENTS

| | | | |
|---|---|---|---|
| 5,386,688 A | 2/1995 | Nakhamkin | |
| 5,778,675 A | 7/1998 | Nakhamkin | |
| 5,845,479 A | 12/1998 | Nakhamkin et al. | |
| 5,845,481 A | 12/1998 | Briesch | |
| 5,934,063 A | 8/1999 | Nakhamkin | |
| 6,038,849 A * | 3/2000 | Nakhamkin | F02C 6/06 60/726 |
| 6,134,873 A | 10/2000 | Nakhamkin et al. | |
| 6,212,871 B1 | 4/2001 | Rakhmailov | |
| 6,244,037 B1 | 6/2001 | Nakhamkin et al. | |
| 6,276,123 B1 | 8/2001 | Chen et al. | |
| 6,305,158 B1 | 10/2001 | Nakhamkin et al. | |
| 7,389,644 B1 | 6/2008 | Nakhamkin | |
| 7,406,828 B1 | 8/2008 | Nakhamkin | |
| 7,614,237 B2 | 11/2009 | Nakhamkin | |
| 7,640,643 B2 | 1/2010 | Nakhamkin | |
| 7,669,423 B2 | 3/2010 | Nakhamkin | |
| 8,011,189 B2 | 9/2011 | Nakhamkin | |
| 8,261,552 B2 | 9/2012 | Nakhamkin | |
| 8,616,005 B1 | 12/2013 | Cousino, Sr. | |
| 8,863,519 B2 | 10/2014 | Kraft | |
| 2001/0000091 A1 | 4/2001 | Nakhamkin et al. | |
| 2005/0087330 A1 | 4/2005 | Kang et al. | |
| 2009/0200805 A1 | 8/2009 | Kim et al. | |
| 2009/0230696 A1* | 9/2009 | Enis | F02C 1/02 290/1 B |
| 2011/0005228 A1 | 1/2011 | Yoshinari et al. | |
| 2011/0181050 A1 | 7/2011 | Dinu | |
| 2012/0036860 A1 | 2/2012 | Wettstein et al. | |
| 2013/0125525 A1* | 5/2013 | Hein | F01K 23/10 60/39.182 |
| 2015/0207382 A1* | 7/2015 | Lenk | F02C 6/18 290/2 |

OTHER PUBLICATIONS

U.S. Appl. No. 14/351,245, filed Apr. 11, 2014, 61 pages.
U.S. Appl. No. 14/329,340, filed Jul. 11, 2014, 76 pages.
U.S. Appl. No. 14/329,433, filed Jul. 11, 2014, 80 pages.
U.S. Appl. No. 14/462,000, filed Aug. 18, 2014, 54 pages.
U.S. Appl. No. 14/534,347, filed Nov. 6, 2014, 41 pages.
U.S. Appl. No. 62/055,247, filed Sep. 25, 2014, 27 pages.
Application No. PCT/US2013/034748, filed Mar. 31, 2013, Search Report and Written Opinion, dated Jun. 28, 2013, 15 pages.
Application No. PCT/US2013/063177, filed Oct. 3, 2013, Search Report and Written Opinion, dated Feb. 28, 2014, 15 pages.
Application No. PCT/US13/65998, filed Oct. 21, 2013, Search Report and Written Opinion, dated May 19, 2014, 18 pages.

* cited by examiner

GAS TURBINE FAST REGULATION AND POWER AUGMENTATION USING STORED AIR

CROSS-REFERENCE TO RELATED APPLICATIONS

None.

TECHNICAL FIELD

The invention relates generally to electrical power systems, including generating capacity of a gas turbine, and more specifically to improving an increase or decrease in speed capability for a gas turbine generator.

BACKGROUND OF THE INVENTION

Generators of gas turbine engines are used for up and down regulation and electrical capacity generation. However, these systems have characteristics where power increase or decrease can happen over several minutes. In order to maintain the stability of the electric grid, a major concern is the unexpected and sudden loss of electricity generation which will cause a frequency drop on the grid. Currently, the best source of fast acting regulation to support this drop condition is hydro power, or power generated from a water source, because hydro can act in seconds and can maintain the desired output. However, relying on hydro power is geographically limited and as the grid grows, a dis-proportionate low level of new hydro generation is being added due to environmental constraints.

Gas turbine engines can also be used in support of this drop condition, but are not nearly as effective as hydro because they require a ramp rate to the desired load conditions which takes minutes, not seconds. Furthermore, in order to have this generating capacity available, the gas turbine engine must be online and at a power level below base load, which is a less efficient set point to operate a gas turbine.

SUMMARY

The current invention provides several embodiments for storing and releasing compressed air to a gas turbine engine in a rapid manner to provide immediate support to a power plant in the event of a reduction in generating capacity on the grid.

The invention disclosed herein pertains to the storage and use of hot compressed air and more specifically to systems and methods for providing hot compressed air that is ready to be dispatched by opening a valve and increasing the air mass flow to the gas turbine engine. This allows gas turbine engine to be operated at a higher, more efficient, load level and have the ability to add fast acting regulation in seconds.

The present invention provides quick response to increasing output capacity on a gas turbine by delivering stored hot compressed air to the point of injection in the gas turbine engine, which allows power increase from the gas turbine engine in seconds. Another aspect of the present invention relates to methods of generating and operating systems for preheating the air injection piping between the stored hot air and the gas turbine engine by bleeding air from the gas turbine engine towards the storage tank or bleeding air from the storage tank towards the gas turbine engine. In another aspect of the present invention, the storage tank of compressed air is heated and maintained at an elevated temperature by an electrical resistor.

In another aspect of the present invention, a continuous hot compressed air generation source, such as a TurboPHASE system produced by PowerPHASE LLC, is utilized with a source of stored hot compressed air, where the stored hot compressed air initially provides hot air to the gas turbine giving time for the TurboPHASE system to start and achieve operating speed, temperature and pressure.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The present invention is disclosed in FIGS. 1-6 and relates to methods and systems of generating and storing hot compressed air, keeping the stored compressed air heated, and then injecting the hot compressed air into the gas turbine engine in response to a change in an electric grid operation. Compressed air can be stored in a tank as well as be generated by an auxiliary system, such as the TurboPHASE system.

Figure 1:
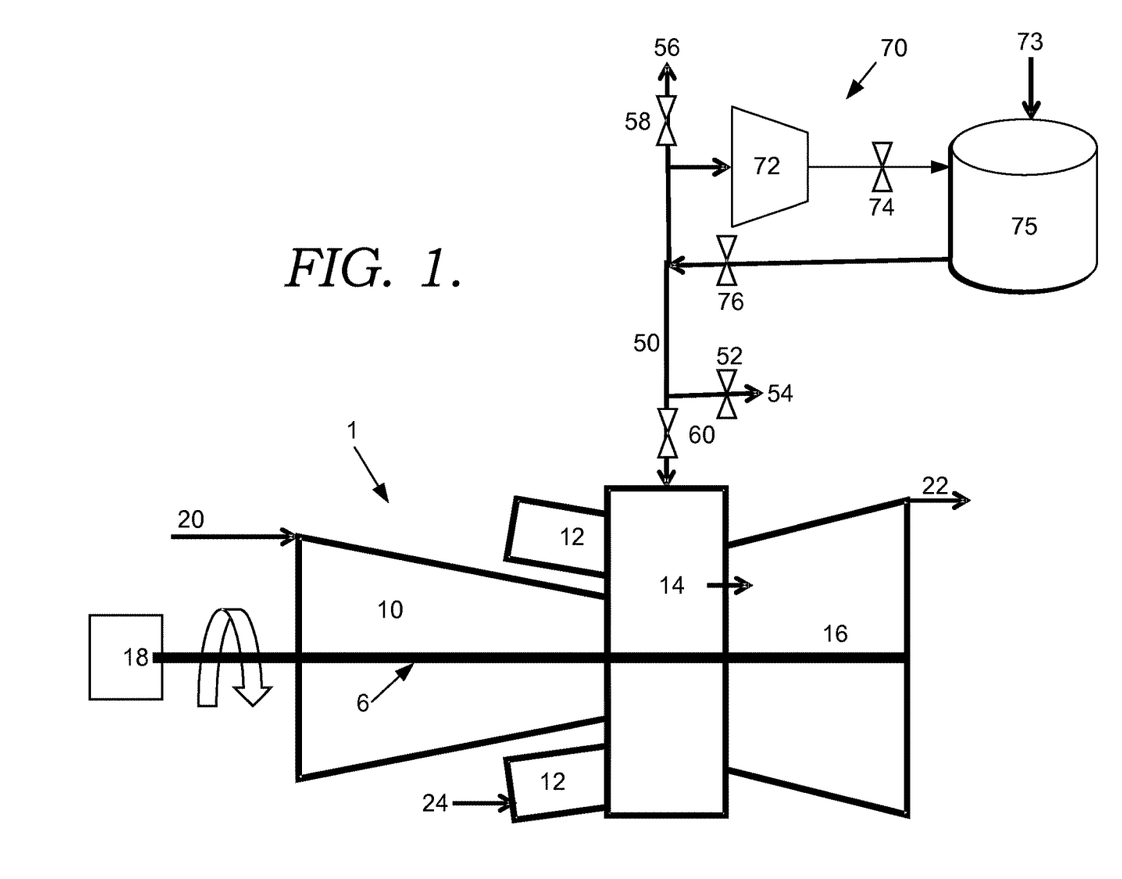
FIG. 1 is a schematic drawing of a stored compressed air injection system in accordance with an embodiment of the present invention.

Referring to FIG. 1, a system for providing a supply of compressed air to an energy system is provided. The system comprises a gas turbine engine 1 having a compressor 10 which compresses ambient air 20 to an elevated pressure and temperature and then discharges the air into a compressor discharge case (CDC) 14. The CDC 14 is also commonly referred to as a wrapper because it houses the complete combustion and transition section of the gas turbine engine 1. The hot pressurized air enters one or more combustion systems 12 where fuel 24 is added and the mixture is ignited to form hot combustion gasses. These hot combustion gases are directed into a turbine 16, where the turbine 16 is coupled to the compressor 10 by a shaft 6. The turbine 16 produces about two times the power that the compressor 10 is consuming, and therefore the net shaft power is delivered to a generator 18.

The present invention also comprises an air injection piping system 50 that is in fluid communication with the gas turbine engine 1. For example, as shown in FIG. 1, the air injection piping system 50 is in selective fluid communication with the CDC 14 by way of an air injection valve 60.

As discussed above, the present invention provides a way of providing heated compressed air to the gas turbine engine 1 to increase output of the engine, thereby increasing output of the generator when there is a grid disruption. In an embodiment of the present invention, an additional supply of compressed air can be provided by a high pressure air storage system 70. The high pressure air storage system 70 comprises a high pressure compressor 72, a storage tank inlet valve 74, a compressed air storage tank 75, and a storage tank outlet valve 76. In an embodiment of the present invention, the high pressure compressor 72 is a reciprocating compressor. The compressed air storage tank 75 can vary in volume depending on the amount of time which the high pressure air storage system 70 is to provide compressed air to the gas turbine engine 1. The air being stored in the storage tank 75 is at an increased temperature, typically upwards of 500 deg. F. and is maintained at this elevated temperature by a heat source such as electric resistor heating element 73 and insulation applied to the storage tank 75. As will be discussed in more detail below, the high pressure compressor 72 can compress ambient air or it can compress, to a high pressure ratio, air from the CDC 14. Also, as one skilled in the art can appreciate, the pressure of the air in the storage tank 75 must be higher than the pressure of the compressor discharge region.

Figure 2:
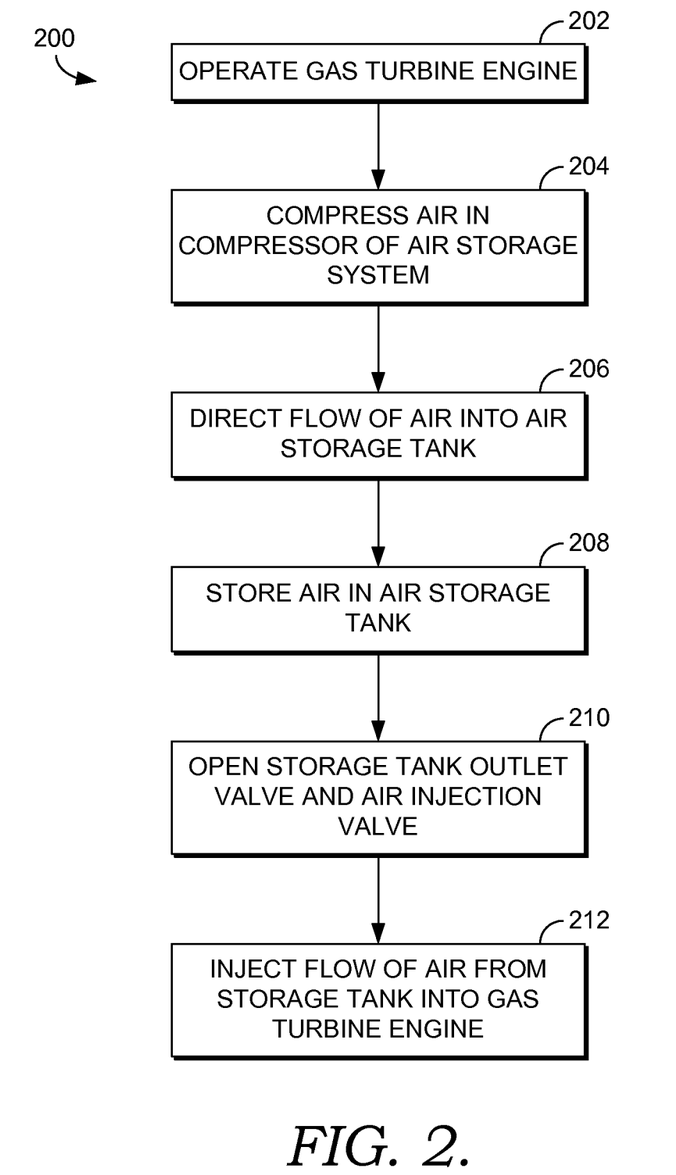
FIG. 2 is a flow diagram of a process for supplying additional compressed air to a gas turbine engine in accordance with an embodiment of the present invention.

Referring to FIG. 2, the operation 200 of the energy generating system of FIG. 1 is depicted. More specifically, in a step 202, a gas turbine engine is operated where the gas turbine engine has a compressor coupled to a turbine through a shaft, one or more combustion systems and a generator coupled to a shaft. In a step 204, a flow of air is compressed in a high pressure compressor of an air storage system. Then, in a step 206, the flow of air is directed from the high pressure compressor and into a compressed air storage tank. In a step 208, the flow of air is stored in the compressed air storage tank until it is needed. As discussed above, the compressed air can be maintained at its elevated temperature by a heating element. Then, in a step 210, a storage tank outlet valve and air injection valve adjacent the gas turbine engine are opened to permit the flow of compressed air to exit the compressed air storage tank and be injected into the gas turbine engine in a step 212. The storage tank outlet valve and air injection valve are adjustable so as to allow for a constant flow of air from the storage tank even as the pressure in the storage tank decreases.

As discussed above, the flow of air from the high pressure air storage system is injected into the gas turbine engine to increase power output from the engine to support grid fluctuations. As part of the air flow injection process, compressed air from the compressed air storage tank can bleed through the storage tank outlet valve and into the piping system 50 and out through a vent valve 52 and vent 54, thereby preheating the air injection piping system 50. Alternatively, the air injection piping system 50 can also be preheated by a flow of compressed air from the CDC 14 flowing through air inlet valve 60 and towards vent valve 58 and vent 56.

Figure 3:
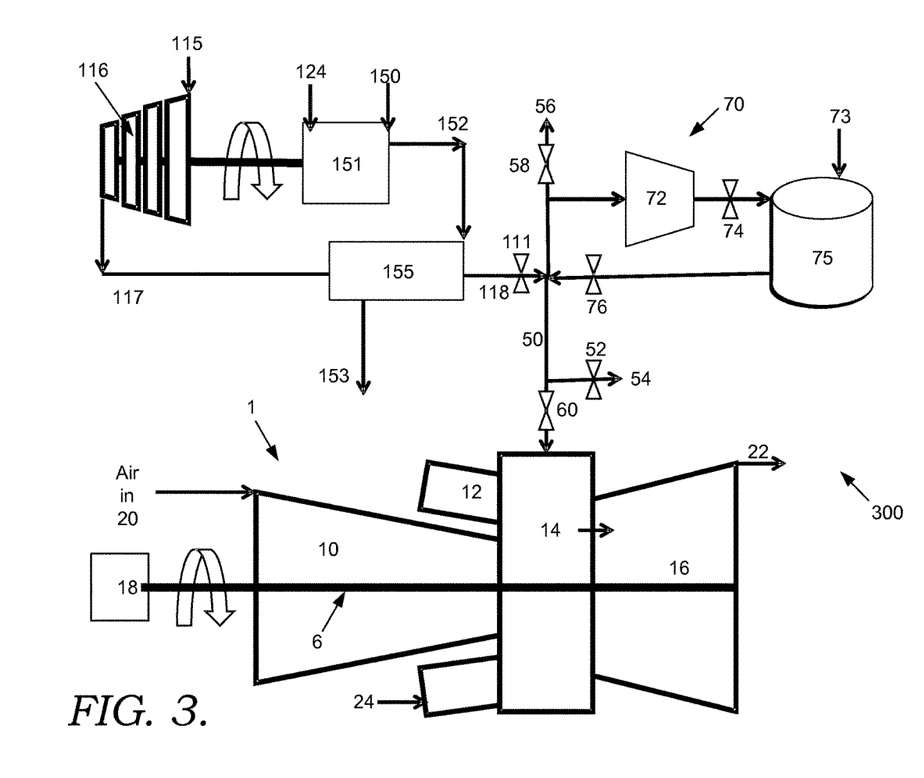
FIG. 3 is a schematic drawing of an embodiment of the present invention utilizing a stored compressed air injection system in conjunction with a supplementary source of compressed air in accordance with an embodiment of the present invention.

Referring now to FIG. 3, an alternate embodiment of the present invention is depicted. A system 300 is capable of providing a supply of hot compressed air to an energy generating system. The system comprises a gas turbine engine 1 having a compressor 10 which compresses ambient air 20 to an elevated pressure and temperature and then discharges the air into a compressor discharge case (CDC) 14. The hot pressurized air enters one or more combustion systems 12 where fuel 24 is added and the mixture is ignited to form hot combustion gasses. These hot combustion gases are directed into a turbine 16, where the turbine 16 is coupled to the compressor 10 by a shaft 6. The turbine 16 produces about twice the power that the compressor 10 is consuming, and therefore the net power is used to drive the generator 18.

The system 300 also comprises an air injection piping system 50 that is in fluid communication with the gas turbine engine 1. As shown in FIG. 3, the air injection piping system 50 is in selected fluid communication with the CDC 14 by way of an air injection valve 60.

The system 300 further comprises a high pressure air storage system 70 that is in selective fluid communication with the gas turbine engine 1 via the air injection piping system 50. As discussed above, the high pressure air storage system 70 generally comprises a high pressure compressor 72, a storage tank inlet valve 74, a compressed air storage tank 75, and a storage tank outlet valve 76. In an embodiment of the present invention, the high pressure compressor 72 is a reciprocating compressor. The compressed air storage tank 75 can vary in volume depending on the amount of time which the high pressure air storage system 70 is to provide compressed air to the gas turbine engine 1. The air being stored in the storage tank 75 is at an increased temperature and is maintained at this elevated temperature by a heat source such as electric resistor heating element 73 and insulation applied to the storage tank 75. As will be discussed in more detail below, the high pressure compressor 72 can compress ambient air or it can compress, to a high pressure ratio, air from the CDC 14. As one skilled in the art can appreciate, the valve must be sized such that when the tank is at full pressure, the valve is only partially opened and when the tank is almost empty, the valve will be opened up much more. The storage tank 75 is sized such that the power augmentation generated equals the power augmentation generated by the TurboPHASE system and can deliver this air flow while the TurboPHASE module is started.

In this embodiment of the invention, the system 300 also comprises an auxiliary source of compressed air that is in selective fluid communication with the gas turbine engine 1 through the air injection piping system 50 and the air injection valve 60. One such auxiliary source of compressed air is a TurboPHASE system produced by PowerPHASE LLC of Jupiter, Fla. The auxiliary source of compressed air comprises a fueled engine 151 that drives a multistage intercooled compressor 116, where the compressor 116 takes in ambient air 115 and discharges warm compressed air 117. The fueled engine 151 takes in ambient air 150 and fuel 124 and delivers the power to drive the compressor 116 and discharges hot exhaust 152. The hot exhaust 152 passes through a recuperator 155 where it is used to heat the warm compressed air 117 from the compressor 116, thereby resulting in hot compressed air 118 and cooler exhaust 153. The hot compressed air then is directed through an auxiliary air injection valve 111 and into the air injection piping system 50. When the auxiliary air injection valve 111 and air vent valve 52 are open, the hot compressed air 118 can flow from the auxiliary source of compressed air and through the air injection piping system 50 where it preheats the piping system 50 and vents the hot compressed air 118 through vent 54.

Figure 4:
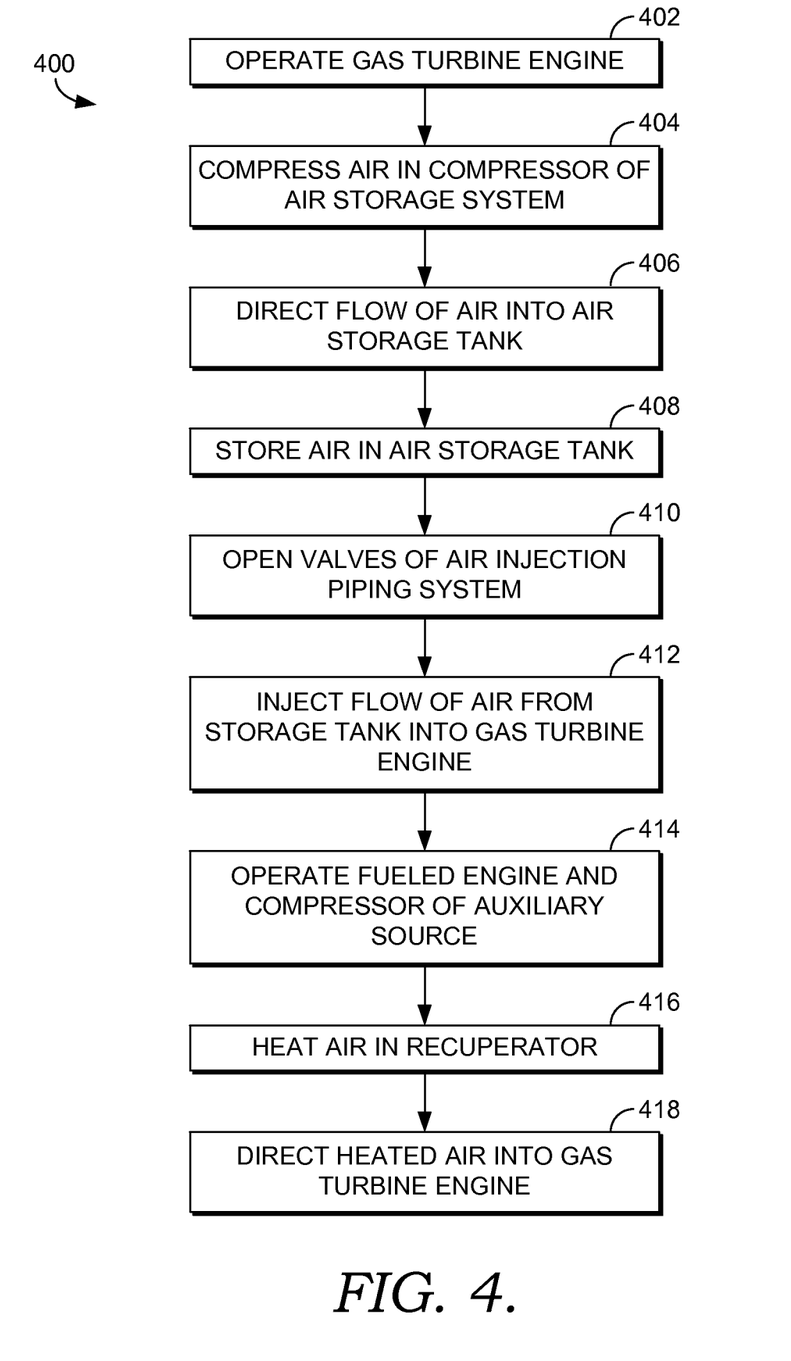
FIG. 4 is a flow diagram of an alternate process for supplying additional compressed air to a gas turbine engine in accordance with an alternate embodiment of the present invention.

Referring now to FIG. 4, a method 400 of operating an energy generating system is disclosed. In a step 402, a gas turbine engine is operated where the gas turbine engine has a compressor coupled to a turbine through a shaft, one or more combustion systems and a generator coupled to a shaft. In a step 404, a flow of air is compressed in a high pressure compressor of an air storage system. Then, in a step 406, the flow of air is directed from the high pressure compressor and into a compressed air storage tank. In a step 408, the flow of air is stored in the compressed air storage tank until it is needed. As discussed above, the compressed air can be maintained at its elevated temperature by a heating element. Then, in a step 410, the valves of the air injection piping system are opened to permit the flow of compressed air to exit the compressed air storage tank and be injected into the gas turbine engine in a step 412. The storage tank outlet valve and air injection valve are opening as required and in a way so as to allow for a constant flow of air from the storage tank even as the pressure in the storage tank decreases.

In a step 414 of an embodiment of the present invention, while the compressed air is injected from the air storage tank, the auxiliary source of compressed air is initiated. More specifically, the fueled engine is operated to drive the intercooled compressor. Then, in a step 416, the compressed air from the compressor is heated in the recuperator, where the recuperator uses exhaust heat from the fueled engine to heat the compressed air. In a step 418, the heated compressed air is directed into the gas turbine engine.

While in the embodiment discussed above, the heated from air from the auxiliary source of compressed air, such as a TurboPHASE system, is injected into the gas turbine engine after the air from the compressed air storage tank, it is to be understood that in an alternate embodiment of the present invention, air can be injected into the gas turbine engine simultaneously from the compressed air storage tank and the auxiliary source of compressed air. By combining the storage and continuous generation of the air that is injected into the gas turbine, the process can be initiated in less than one second and then sustained indefinitely.

As one skilled in the art understands, in order for the compressed air generated by the high pressure air storage system and the auxiliary source of compressed air to be injected into the gas turbine engine 1, it is necessary for the compressed air generated by these systems to be greater than the pressure of the air in the gas turbine engine. Furthermore, in an embodiment of the present invention, the flow of compressed air being compressed by the high pressure compressor of the high pressure air storage system compresses the air passing therethrough to a pressure of at least 50% higher than compressed air in the gas turbine engine 1.

An auxiliary source of compressed air as disclosed above is capable of starting and coming up to desired operating conditions in under 2 minutes. The system can deliver approximately 12 lb/sec of 600 F, 220 psi air (air density=0.56 lb/ft$^3$) to the gas turbine engine continuously. Therefore, the high pressure air storage system also needs to be able to deliver 12 lb/sec of 600 F, 220 psi air for 2 minutes. When this level of air injection is applied to an F-Class gas turbine, 4.5 MW is produced from the gas turbine instantaneously. This equates to 1440 pounds of air to be discharged. Therefore, at a moderate storage pressure of 3600 psi, temperature of 600 F, with an air density of 9.15 lb/ft3, a storage volume of 168 ft$^3$ is required, or a single two foot diameter tank extending 27 feet in length. Therefore, a single storage tank can be integrated into the auxiliary source of compressed air, such as a TurboPHASE system, and deliver the stored air to the gas turbine engine and the power output from the gas turbine is increased virtually instantaneously while the auxiliary source of compressed air is brought on line and provides a continual source of compressed air.

The power delivered from the present invention provides a fast-acting solution at an improved cost compared to other ways to add capacity to the electric grid. For example, a battery typically costs about $1000/kW. The present invention provides for the option of continuous capacity addition, and adds 4.5 MW to the engine performance, at an approximate cost of $67/kW.

Figure 5:
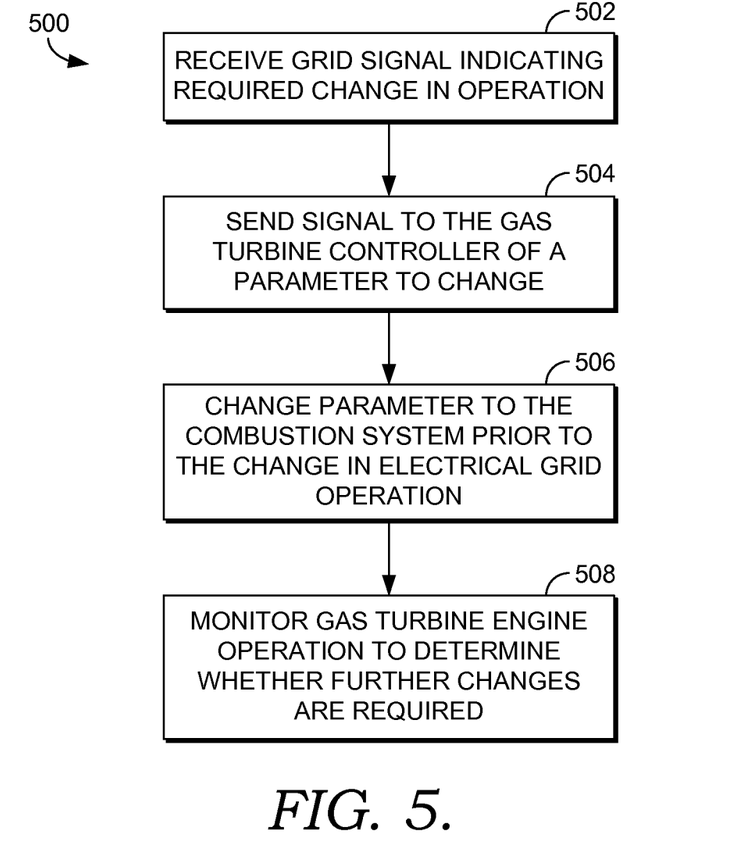
FIG. 5 is a flow diagram of a process of responding to a change in an electric grid in accordance with an embodiment of the present invention.
Figure 6:
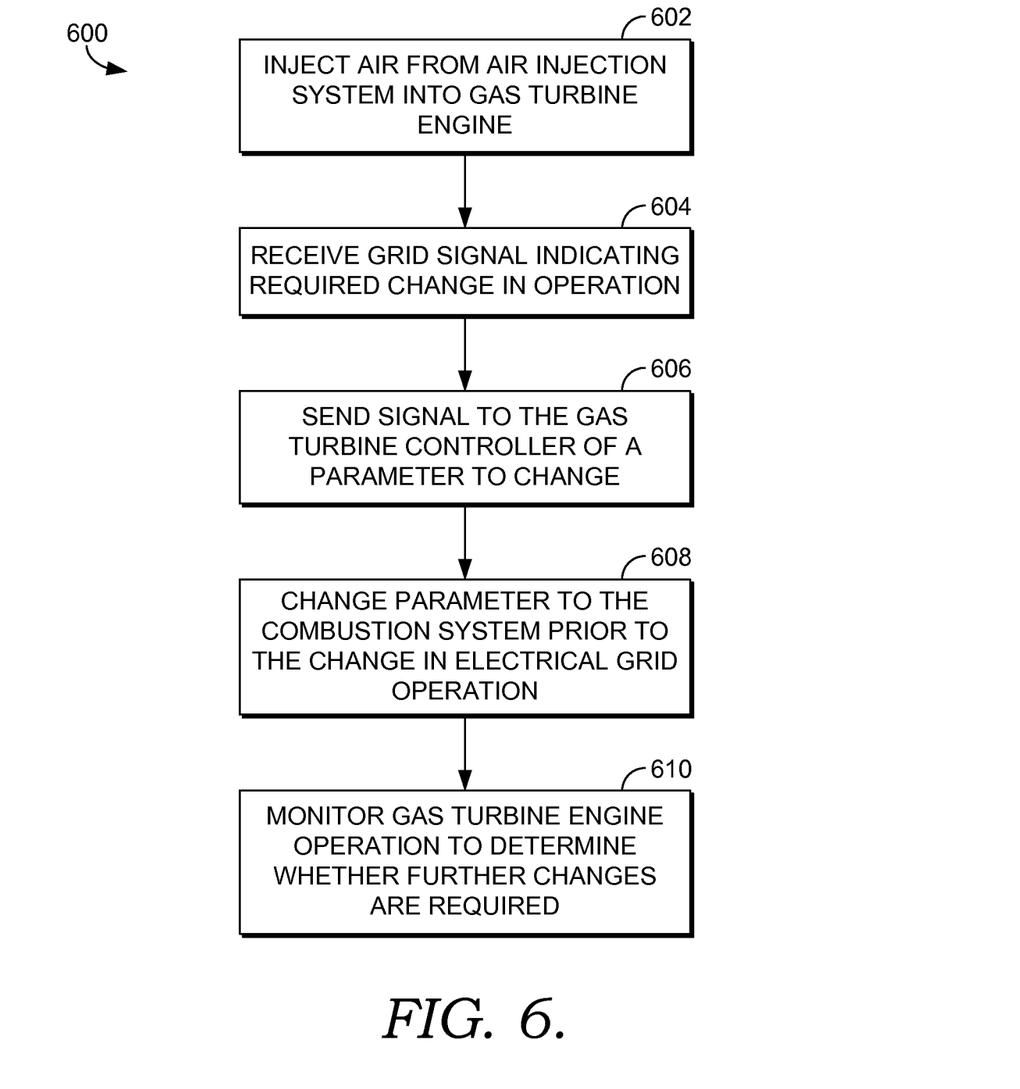
FIG. 6 is a flow diagram of an alternate process of responding to a change in an electric grid in accordance with an embodiment of the present invention.

In an alternate embodiment of the present invention, methods of controlling a gas turbine engine in response to a rapid change in an electrical grid are disclosed in FIGS. 5 and 6. As discussed above, the rapid changes to the electrical grid can be a sudden increase or decrease in power supply, such as when the generating capacity suddenly and unexpectedly goes offline.

Referring to FIG. 5, a method 500 of controlling a gas turbine engine comprises receiving a grid signal indicating a change in operation of the electrical grid in a step 502. Then, in a step 504, a signal is sent to a gas turbine controller of a parameter that is to be changed in order for the gas turbine engine, and the power it produces, to comply with the grid signal. In a step 506 the parameter to the combustion system is changed prior to the change in operation of the electrical grid occurring. As discussed above, the parameter of the combustion system being changed can be air flow, fuel flow, or gas turbine firing temperature. Such parameters alter the available power output, and thus electrical generating capacity, of the gas turbine engine. Then, in a step 508, operation of the gas turbine engine is monitored to determine whether further changes to the parameter of the combustion system are necessary.

Referring now to FIG. 6, an alternate method for controlling the gas turbine engine in response to a rapid change in an electrical grid is disclosed. The method 600 relates to controlling a gas turbine engine where an air supply is provided to the engine from an external source, such as a supplemental air injection system. In a step 602, an air flow supply is injected from an air injection system and into the gas turbine engine and in a step 604, a grid signal is received indicating a change in operation of the electrical grid is to occur. Then, in a step 606, a signal is sent to a gas turbine controller of a parameter that is to be changed in order for the gas turbine engine, and the power it produces, to comply with the grid signal. In a step 608 the parameter to the combustion system is changed prior to the change in operation of the electrical grid occurring. As discussed above, the parameter of the combustion system being changed can be air flow, fuel flow, or gas turbine firing temperature. Such parameters alter the available power output, and thus electrical generating capacity, of the gas turbine engine. Then, in a step 610, operation of the gas turbine engine is monitored to determine whether further changes to the parameter of the combustion system are necessary.

Another characteristic of the disclosed invention is how it is controlled. Typically, the gas turbine control system reacts to changes, in other words, when the ambient temperature changes for example, the control system reacts to the physical measurements that are being measured real time, typically 10 times per second, and are constantly adjusting fuel flow, inlet guide vanes to operate the gas turbine according to a fixed schedule. One of the main considerations for these changes is the combustion stability, which is driven by fuel air ratio in the combustor and precisely where the fuel and air is being delivered. Most dry low NOx combustors have different circuits that are designed to promote flame stability as well as thorough mixing promoting low NOx. If a sudden addition of air is introduced, 2 second air injection testing has shown that the existing control system is adequate to adjust the fuel air mixture and not cause a lean blow out event, however, all combustion systems are different and there may be cases where the control system needs to be "warned" ahead of time in order to react to fast air injection. In this case, when a grid signal come in for a sudden regulation up, or sudden air injection, a signal can be sent to the gas turbine controller either at the same time or just ahead of time to slightly richen up or stabilize the combustor. Every combustion system is different and stabilizing the combustor could mean different things to different combustors. For example on a GE DLN1 combustion system, the percentage fuel going to the pilot circuit might be increased temporarily. Another example is on a DLN2.6 combustion system, increasing stability may be increasing PM1 fuel split temporally.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A system for providing a supply of hot compressed air to an energy generating system comprising: a gas turbine engine comprising a compressor coupled to a turbine through a shaft, one or more combustion systems in fluid communication with the compressor and the turbine, and a generator coupled to the shaft; an air injection piping system in communication with the gas turbine engine through an air injection valve; and, a high pressure air storage system comprising: a high pressure compressor; a compressed air storage tank; an electrical heating source formed on the compressed air storage tank for maintaining the compressed air storage tank at an elevated temperature; a storage tank outlet valve; wherein the high pressure air storage system is in selective fluid communication with the gas turbine engine; and wherein the supply of hot compressed air is injected into a Brayton cycle system.

2. The system of claim 1, wherein compressed air from the compressed air storage tank bleeds through the storage tank outlet valve and preheats the air injection piping system.

3. The system of claim 1, wherein the air injection piping system is selectively preheated with compressed air from the compressed air storage tank or from the gas turbine engine.

4. The system of claim 1, wherein the high pressure compressor of the high pressure air storage system compresses ambient air or further compresses compressed air from the gas turbine engine.

5. The system of claim 1, wherein the high pressure compressor is a reciprocating air compressor.

6. The system of claim 1, wherein the storage tank outlet valve and injection valve operate to allow a constant flow of air from the storage tank as pressure in the storage tank decreases.

7. A system for providing a supply of hot compressed air to an energy generating system comprising: a gas turbine engine comprising a compressor coupled to a turbine through a shaft, one or more combustion systems in fluid communication with the compressor and the turbine, and a generator coupled to the shaft where the compressor is compressing ambient pressure air; an air injection piping system in communication with the gas turbine engine through an air injection valve; a high pressure air storage system in selective fluid communication with the gas turbine engine via the air injection piping system, the high pressure air storage system having a high pressure compressor, a compressed air storage tank having an electrical heating source formed on the compressed air storage tank for maintaining air in the compressed air storage tank at an elevated temperature, and a storage tank outlet valve; an auxiliary source of compressed air in selective fluid communication with the gas turbine engine via the air injection piping system comprising: a fueled engine coupled to a multi-stage intercooled compressor, the fueled engine producing exhaust heat and the multi-stage intercooled compressor compressing ambient pressure air; a recuperator receiving compressed air from the multi-stage intercooled compressor and heating the compressed air with the exhaust heat; and, an air injection valve located between the recuperator and the air injection piping system; wherein the high pressure air storage system and the auxiliary source of compressed air provide an increase in compressed air flow to the gas turbine engine; and wherein the supply of hot compressed air is injected into a Brayton cycle system.

8. The system of claim 7, wherein compressed air is simultaneously injected into the gas turbine engine from the compressed air storage tank and the auxiliary source of compressed air, where the auxiliary source of compressed air is heated with only exhaust heat from the fueled engine.

9. The system of claim 7, wherein compressed air from the compressed air storage tank is directed through the storage tank outlet valve and preheats the air injection piping system.

10. The system of claim 7, wherein compressed air from the auxiliary source of compressed air is directed through the air injection valve and preheats the air injection piping system.

11. The system of claim 7, wherein the high pressure compressor of the high pressure air storage system compresses ambient air or compressed air from the gas turbine engine.

12. The system of claim 7 wherein the high pressure compressor is a multistage intercooled reciprocating compressor.

13. A method of operating an energy generating system comprising: operating a gas turbine engine comprising a compressor coupled to a turbine through a shaft, one or more combustion systems in fluid communication with the compressor and the turbine, and a generator coupled to the shaft; compressing a flow of air in a high pressure compressor of an air storage system; directing the flow of air from the high pressure compressor and into a compressed air storage tank; storing the flow of air in the compressed air storage tank; heating the flow of air in the compressed air storage tank with an electrical heating source formed on the compressed air storage tank; opening a storage tank outlet valve; and injecting the flow of air from the compressed air storage tank into a Brayton cycle system.

14. The method of claim 13, wherein the flow of compressed air passes from the compressed air storage tank and through an air injection piping system before injecting into the gas turbine engine.

15. The method of claim 13 further comprising preheating the air injection piping system with a portion of the flow of air from the compressed air storage tank.

16. The method of claim 13, wherein the flow of air compressed by the high pressure compressor is compressed to a pressure at least 50% higher than compressed air in the gas turbine engine.

17. A method of operating an energy generating system comprising: operating a gas turbine engine comprising a compressor coupled to a turbine through a shaft, one or more combustion systems in fluid communication with the compressor and the turbine, and a generator coupled to the shaft; compressing a flow of air through a high pressure compressor of an air storage system; directing the flow of air from the high pressure compressor into a compressed air storage tank; storing the flow of air in the compressed air storage tank; heating the air in the compressed air storage tank at an elevated temperature with an electrical heating source formed on the compressed air storage tank; opening a valve of an air injection piping system; injecting the flow of air from the compressed air storage tank through an open storage tank outlet valve and into a Brayton cycle system; operating a fueled engine coupled to a multi-stage intercooled compressor to produce compressed air, the fueled engine producing exhaust heat; heating the compressed air in a recuperator with the exhaust heat from the fueled engine; and, directing the compressed air into the gas turbine engine.

18. The method of claim 17 further comprising preheating the air injection piping system.

19. The method of claim 17, wherein the flow of air compressed by the high pressure compressor is compressed to a pressure at least 50% higher than compressed air in the gas turbine engine.

20. The method of claim 17, wherein the flow of air from the compressed air storage tank and the intercooled compressor are injected simultaneously.

21. The method of claim 17, wherein the flow of air from the compressed air storage tank is injected into the energy generating system prior to the compressed air from the intercooled compressor.

22. A method for providing a supply of hot compressed air to an energy generating system, the method comprising generating energy from a gas turbine engine comprising a compressor coupled to a turbine through a shaft, one or more combustion systems in fluid communication with the compressor and the turbine, and a generator coupled to the shaft where the compressor is compressing ambient pressure air, the gas turbine engine fitted with an air injection piping system in communication with the gas turbine engine through an air injection valve, the air injection piping system and the air injection valve configured to allow hot air injection for incremental energy generation from a high pressure air storage system and an auxiliary source of compressed air individually or collectively; wherein the incremental energy generation from the high pressure air storage is derived by injecting hot compressed air from the high pressure air storage system which is in selective fluid communication with the gas turbine engine via the air injection piping system, the high pressure air storage system having a high pressure compressor, a compressed air storage tank, an electrical heat source for maintaining the compressed air storage tank at an elevated temperature, and a storage tank outlet valve; wherein the incremental energy generation from the auxiliary source of compressed air is derived by injecting hot compressed air from the auxiliary source of compressed air which is in selective fluid communication with the gas turbine engine via the air injection piping system, the auxiliary source of compressed air comprising: a fueled engine coupled to a multi-stage intercooled compressor, the fueled engine producing exhaust heat and the multi-stage intercooled compressor compressing ambient pressure air; a recuperator receiving compressed air from the multi-stage intercooled compressor and heating the compressed air with the exhaust heat; and, an air injection valve located between the recuperator and the air injection piping system; and injecting the supply of hot compressed air into a Brayton cycle.

23. The method of claim 22, further comprising simultaneously injecting the hot compressed air into the gas turbine engine from the compressed air storage tank and the auxiliary source of compressed air, where the auxiliary source of compressed air is heated from only the exhaust heat of the fueled engine.

24. The method of claim 22, further comprising preheating the air injection piping system with hot compressed air from the compressed air storage tank which is directed through the storage tank outlet valve.

25. The method of claim 22, further comprising preheating the air injection piping system with hot compressed air from the auxiliary source of compressed air which is directed through the air injection valve.

26. The method of claim 22, further comprising compressing ambient pressure air or cooled compressed air from the gas turbine engine with the high pressure compressor of the high pressure air storage system.

* * * * *